W. E. BOREN.
NUT LOCK.
APPLICATION FILED APR. 9, 1913.
1,128,748.
Patented Feb. 16, 1915.
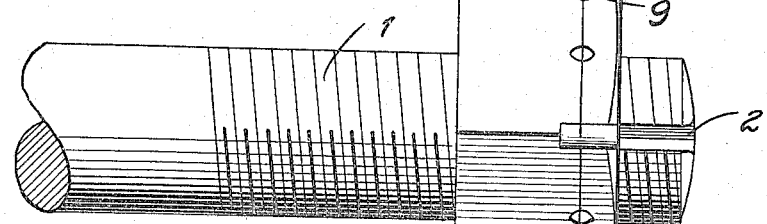
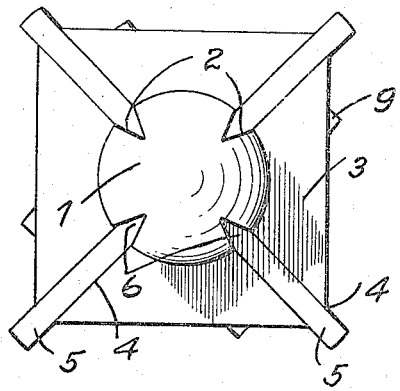
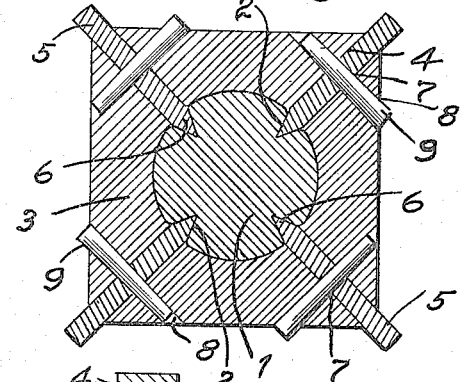
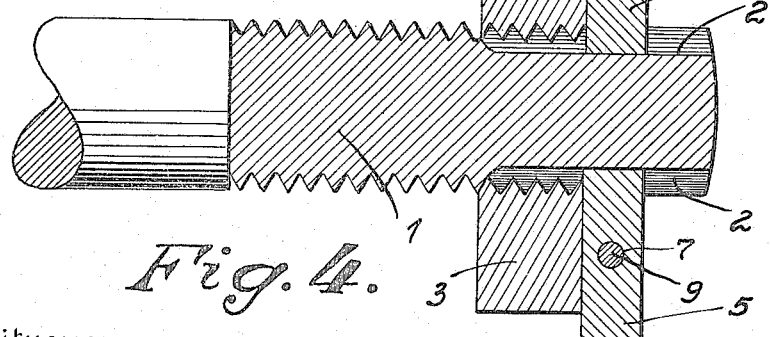
Witnesses
M. S. Watson
Inventor
W. E. Boren
By
Chandler & Chandler
Attorneys

UNITED STATES PATENT OFFICE.

WILLIAM E. BOREN, OF LAKEVIEW, TEXAS.

NUT-LOCK.

1,128,748.  Specification of Letters Patent. Patented Feb. 16, 1915.

Application filed April 9, 1913. Serial No. 759,985.

*To all whom it may concern:*

Be it known that I, WILLIAM E. BOREN, a citizen of United States, residing at Lakeview, in the county of Hall, State of Texas, have invented certain new and useful Improvements in Nut-Locks; and I do hereby declare the following to be a full, clear, and exact description of the invention, such as will enable others skilled in the art to which it appertains to make and use the same.

The present invention is directed to improvements in nut locks, and has for its object to so construct a device of this character that a nut can be easily applied to the bolt or removed therefrom, and when in place thereon will be held against accidental rotation in respect to the bolt.

A further object of the invention is to provide a nut lock which is exceedingly simple, effective in operation, and one which may be manufactured at a minimum cost.

With these and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a top plan view. Fig. 3 is a sectional view on line 3—3 of Fig. 1. Fig. 4 is a longitudinal sectional view through the device.

Referring to the drawing, the numeral 1 designates a bolt having formed therein longitudinal V-shaped grooves 2. Adapted for engagement with the bolt 1 is a nut 3, the same being preferably rectangular in shape and has formed therein radial grooves 4, the outer ends of which open at the corners of the nut. After the nut has been properly positioned upon the bolt key plates 5 are placed in the grooves 4 with their beveled ends 6 engaged in the grooves 2 formed in the bolt, thereby preventing said nut from rotating. Each key plate 5 is formed with a perforation 7 which registers with the obliquely disposed bores 8 formed in the nut 2, and in which are inserted pins 9, which also pass through the perforations 7 formed in the key plates 5, thereby preventing accidental removal of said plates.

From the foregoing description, it will be seen that a nut lock has been produced which can be easily applied to the bolt, and firmly locked against accidental displacement therefrom.

What is claimed is:—

In combination, a nut adapted to engage the end of a bolt, the said nut having radially extending slots therein, key plates removably mounted in said slots and adapted to extend into the said bolt, tapered holes intersecting said slots, and tapered pins inserted through said holes so as to pass through the key plates to maintain the same in position.

In testimony whereof, I affix my signature, in the presence of two witnesses.

WILLIAM E. BOREN.

Witnesses:
J. A. BATSON,
J. P. WOODALL.

Copies of this patent may be obtained for five cents each, by addressing the "Commissioner of Patents, Washington, D. C."